US012237884B2

United States Patent
Jalloul et al.

(10) Patent No.: US 12,237,884 B2
(45) Date of Patent: Feb. 25, 2025

(54) ENHANCEMENT TO MULTI-USER MIMO BY CHANNEL STATE INFORMATION REPORTING

(71) Applicant: Apple Inc., Cupertino, CA (US)

(72) Inventors: Louay Jalloul, San Jose, CA (US); Ghaith N. Hattab, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 432 days.

(21) Appl. No.: 17/887,899

(22) Filed: Aug. 15, 2022

(65) Prior Publication Data

US 2023/0098863 A1 Mar. 30, 2023

Related U.S. Application Data

(60) Provisional application No. 63/248,419, filed on Sep. 24, 2021.

(51) Int. Cl.
*H04B 7/0452* (2017.01)
*H04B 7/0456* (2017.01)
*H04L 5/00* (2006.01)
*H04W 72/1273* (2023.01)

(52) U.S. Cl.
CPC ......... *H04B 7/0452* (2013.01); *H04B 7/0456* (2013.01); *H04L 5/0051* (2013.01); *H04L 5/0057* (2013.01); *H04W 72/1273* (2013.01)

(58) Field of Classification Search
None
See application file for complete search history.

(56) References Cited

U.S. PATENT DOCUMENTS

2014/0254517 A1   9/2014 Nam et al.

FOREIGN PATENT DOCUMENTS

| CN | 104170272 | 11/2014 |
|---|---|---|
| CN | 109565370 | 4/2019 |
| WO | WO 2013119382 | 8/2013 |
| WO | WO 2017218794 | 12/2017 |
| WO | WO 2018040074 | 3/2018 |

OTHER PUBLICATIONS

Extended European Search Report in European Appln. No. 22194885.4, dated Jan. 23, 2023, 9 pages.

*Primary Examiner* — Walter J Divito
(74) *Attorney, Agent, or Firm* — Fish & Richardson P.C.

(57) ABSTRACT

Methods and systems are for configuring multi-user multiple-input multiple output (MU-MIMO) operation by a base station and a plurality of UEs include requesting sounding reference signals (SRS) or channel state information (CSI) data from each UE of the plurality; configuring, based on the SRS or CSI data from each UE, a precoder matrix, the precoder matrix allocating a plurality of precoded CSI-reference signal (CSI-RS) resources for each UE; scheduling, for each UE, the precoded CSI-RS resources; receiving, from each UE, a CQI report that is based on the precoded CSI-RS resources received by that respective UE; generating a CQI matrix from the CQI reports of each UE; selecting a subset of UEs from the plurality based on the CQI matrix; and scheduling DL resources for the subset of UEs, the DL resources including reference signals.

20 Claims, 6 Drawing Sheets

ENHANCEMENT TO MULTI-USER MIMO BY CHANNEL STATE INFORMATION REPORTING

CLAIM OF PRIORITY

This application claims priority under 35 U.S.C. § 119(e) to U.S. Patent Application Ser. No. 63/248,419, filed on Sep. 24, 2021, the entire contents of which are hereby incorporated by reference.

TECHNICAL FIELD

This disclosure relates generally to wireless communications.

BACKGROUND

For fifth generation (5G) new radio (NR) networks, multi-user multiple-input multiple output (MU-MIMO) enables a base station (e.g., a node, evolved node eNB, a next generation node gNB, and so forth) to simultaneously send data streams to multiple users over same time-frequency resources. MU-MIMO enhances a network or cell throughput. In particular, in high-correlation channel scenarios, the UE supports a limited number of download (DL) data streams, and so the network switches from single-user MIMO (SU-MIMO) to MU-MIMO, providing data streams to different users with low cross-correlations due to the users being physically far from each other. Generally, MU-MIMO increases a number of resources by adding a spatial dimension. For example, by using a time-frequency-space grid instead of a time-frequency grid, a same UE can have more resources to use, increasing throughput for the UE.

SUMMARY

This application describes data processing systems and processes for enhancement to multi-user MIMO by channel state information (CSI) reporting. As described herein, the UE is configured to assist a base station (e.g., a gNB, node, eNB, etc.) to select one or more UEs out of a set of UEs for MU-MIMO using CSI reporting. Alternatively or in addition, the base station is configured to generate (e.g., refine, configure, determine, etc.) the DL precoder to improve MU-MIMO operation, such as increasing overall data throughput, selecting better UEs from the set of available UEs, and minimizing interference among UEs connected to a base station during MU-MIMO operation of the base station.

Generally, 5G NR provides MIMO enhancements to enable MU-MIMO. For example, type-II CSI feedback enables the UE to send a more accurate channel-state feedback (e.g., CSI). NR type-II refers to use of a type-II codebook in which a group of beams are selected for the channel, and each of the beam of the group are linearly combined for transmitting data. In contrast, an NR type-I codebook refers to selection of a single beam in the group of beams for communication. The precoder matrix (or precoder) indicates which beams of the UE are selected for communication, and can therefore indicate the co-phasing and amplitude scaling of the selected beams for the respective UE. The UE can report this configuration to the base station using a precoding matrix indicator (PMI).

The CSI is used to determine a downlink (DL) precoder that is used for performing MU-MIMO. Generally, in time-division duplexing (TDD) systems, the UE uses uplink (UL) sounding reference signals (SRS) to estimate quality of the downlink channel, assuming channel reciprocity. The UE sends these data to the base station, which designs the MU-MIMO DL precoder based on the DL channel estimates from each UE. In some implementations, each UE designs a respective precoder. Non-zero power CSI reference signals (NZP-CSI-RS) support both channel measurements and interference measurements.

For MU-MIMO, a base station receives a set of estimated DL channels between a given number (K) of UEs and the base station, called the super channel. The super channel is based on a number of antennas at each UE and the base station. The base station receives information indicating what the state of each UE channel is for the super channel to generate a DL precoder for MU-MIMO so that each UE receives a respective data stream with limited interference from data streams of other connected UEs. In some implementations, the base station schedules a subset of the available UEs for MU-MIMO.

The systems and processes described in this document enable one or more of the following advantages, among other advantages. The proposed systems and methods enable a base station to accurately estimate the super channel of a selected group of UEs for MU-MIMO, including a set of all the available UEs or subset of available UEs. The methods and systems disclosed herein enable the base station to determine a precoder based on the super channel of a set of potentially connected UEs for MU-MIMO. The base station precoder based on the super channel is more accurate than UE-based precoder generation. For example, for type-II CSI feedback, each UE sends a generated precoder to the base station. The UE-generated precoder is typically based on a channel between the UE and the base station, and not the super channel. Further, to limit overhead, the UE-generated precoder is quantized, which results in some information loss. Additionally, for the case of SRS-based channel estimation, each DL channel is estimated by the base station from the UL SRS signal of each respective UE. However, the DL channel is not identical to the UL channel due to different radio frequency (RF) impairments at the UE and base station. The methods and systems describe herein enable estimating the DL channel in a way that captures interference experienced by the UE. Even with calibration, estimating the DL channel from the UL signal, as typically performed, does not capture the interference seen at the UE.

The disclosed techniques are realized by one or more implementations, described in an examples section herein.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
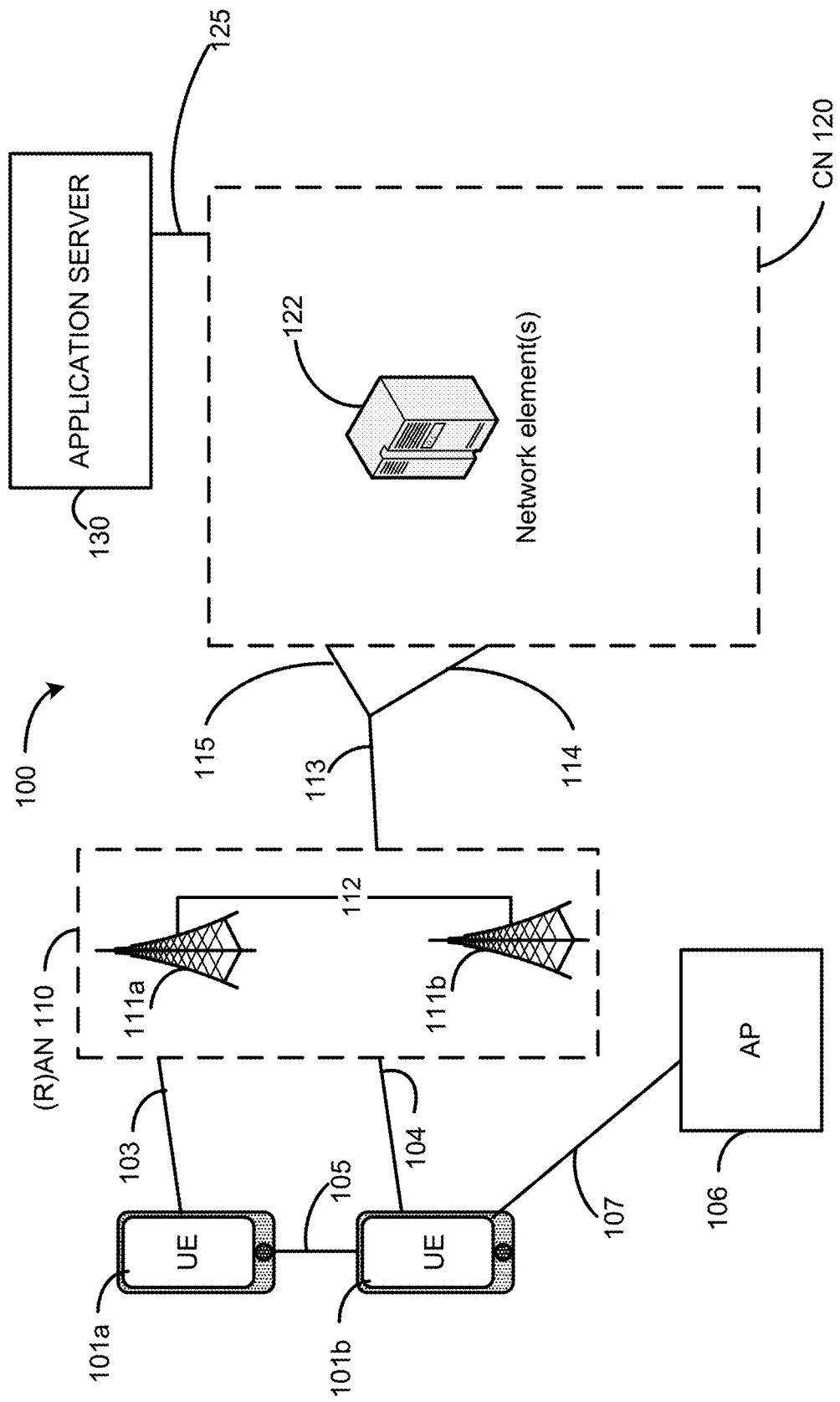
FIG. 1 illustrates an example wireless communication system, according to various implementations herein.

FIG. 1 illustrates an example of a wireless communication system 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

The UEs 101 may be configured to connect, for example, communicatively couple, with RAN 110. In implementations, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system or 5G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various implementations, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system or 5G system 100 (e.g., an eNB, a gNB, etc.). According to various implementations, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 111 may be implemented as one or more software entities running on server computers as part of a virtual network, which may be referred to as a CRAN and/or a virtual baseband unit pool (vBBUP). In these implementations, the CRAN or vBBUP may implement a RAN function split, such as a PDCP split wherein RRC and PDCP layers are operated by the CRAN/vBBUP and other L2 protocol entities are operated by individual RAN nodes 111; a MAC/

PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some implementations, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the implementations is not limited in this respect. The OFDM signals can comprise a plurality of orthogonal subcarriers.

In some implementations, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various implementations, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some implementations may use concepts for resource allocation for control channel information that are an extension of the above-described concepts. For example, some implementations may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In implementations where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In implementations where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network-in this implementation, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some implementations, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In implementations, the CN 120 may be a 5GC (referred to as "5GC 120" or the like), and the RAN 110 may be connected with the CN 120 via an NG interface 113. In implementations, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs.

In implementations, the CN 120 may be a 5G CN (referred to as "5GC 120" or the like), while in other implementations, the CN 120 may be an EPC). Where CN 120 is an EPC (referred to as "EPC 120" or the like), the RAN 110 may be connected with the CN 120 via an S1 interface 113. In implementations, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMES.

Figure 2:
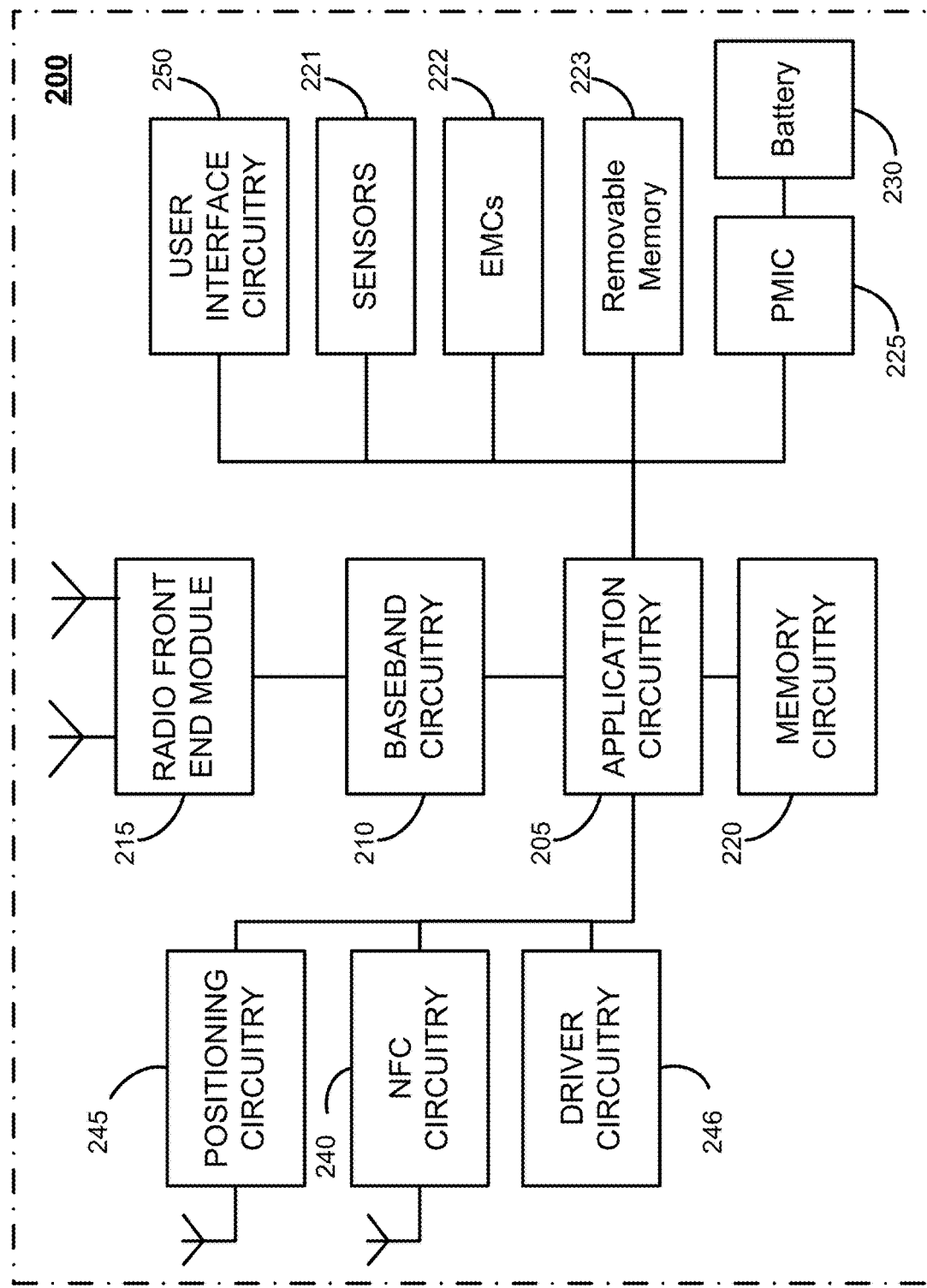
FIG. 2 illustrates an example of a computing device in accordance with various implementations.

FIG. 2 illustrates an example of a platform 200 (or "device 200") in accordance with various implementations. In implementations, the computer platform 200 may be suitable for use as UEs 101, application servers, and/or any other element/device discussed herein. The platform 200 may include any combinations of the components shown in the example. The components of platform 200 may be implemented as integrated circuits (ICs), portions thereof, discrete electronic devices, or other modules, logic, hardware, software, firmware, or a combination thereof adapted in the computer platform 200, or as components otherwise incorporated within a chassis of a larger system. The block diagram of FIG. 2 is intended to show a high level view of components of the computer platform 200. However, some of the components shown may be omitted, additional components may be present, and different arrangement of the components shown may occur in other implementations.

Application circuitry 205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports.

The processor(s) of application circuitry may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry may comprise, or may be, a special-purpose processor/controller to operate according to the various implementations herein.

As examples, the processor(s) of application circuitry 205 may include an Apple A-series processor. The processors of the application circuitry 205 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 205 may be a part of a system on a chip (SoC) in which the application circuitry 205 and other components are formed into a single integrated circuit.

Additionally or alternatively, application circuitry 205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like.

The baseband circuitry 210 may be implemented, for example, as a solder-down substrate including one or more integrated circuits, a single packaged integrated circuit soldered to a main circuit board or a multi-chip module containing two or more integrated circuits.

The RFEMs 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include any number and type of memory devices used to provide for a given amount of system memory. As examples, the memory circuitry 220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc.

Removable memory circuitry 223 may include devices, circuitry, enclosures/housings, ports or receptacles, etc. Used to couple portable data storage devices with the platform 200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 200 may also include interface circuitry (not shown) that is used to connect external devices with the platform 200. The external devices connected to the platform 200 via the interface circuitry include sensor circuitry 221 and electro-mechanical components (EMCs) 222, as well as removable memory devices coupled to removable memory circuitry 223.

The sensor circuitry 221 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 222 include devices, modules, or subsystems whose purpose is to enable platform 200 to change its state, position, and/or orientation, or move or control a mechanism or (sub)system. Additionally, EMCs 222 may be configured to generate and send messages/signaling to other components of the platform 200 to indicate a current state of the EMCs 222.

In some implementations, the interface circuitry may connect the platform 200 with positioning circuitry 245. The positioning circuitry 245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like.

In some implementations, the interface circuitry may connect the platform 200 with Near-Field Communication (NFC) circuitry 240. NFC circuitry 240 is configured to provide contactless, short-range communications based on radio frequency identification (RFID) standards, wherein magnetic field induction is used to enable communication between NFC circuitry 240 and NFC-enabled devices external to the platform 200 (e.g., an "NFC touchpoint").

The driver circuitry 246 may include software and hardware elements that operate to control particular devices that are embedded in the platform 200, attached to the platform 200, or otherwise communicatively coupled with the platform 200. The driver circuitry 246 may include individual drivers allowing other components of the platform 200 to interact with or control various input/output (I/O) devices that may be present within, or connected to, the platform 200.

The power management integrated circuitry (PMIC) 225 (also referred to as "power management circuitry 225") may manage power provided to various components of the platform 200. In particular, with respect to the baseband circuitry 210, the PMIC 225 may control power-source selection, voltage scaling, battery charging, or DC-to-DC conversion. The PMIC 225 may often be included when the platform 200 is capable of being powered by a battery 230.

In some implementations, the PMIC 225 may control, or otherwise be part of, various power saving mechanisms of the platform 200. For example, if the platform 200 is in an RRC_Connected state, where it is still connected to the RAN node as it expects to receive traffic shortly, then it may enter a state known as Discontinuous Reception Mode (DRX) after a period of inactivity. During this state, the platform 200 may power down for brief intervals of time and thus save power. If there is no data traffic activity for an extended period of time, then the platform 200 may transition off to an RRC_Idle state, where it disconnects from the network and does not perform operations such as channel quality feedback, handover, etc. The platform 200 goes into a very low power state and it performs paging where again it periodically wakes up to listen to the network and then powers down again. The platform 200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 230 may power the platform 200, although in some examples the platform 200 may be mounted deployed in a fixed location, and may have a power supply coupled to an electrical grid. The battery 230 may be a lithium ion battery, a metal-air battery, such as a zinc-air battery, an aluminum-air battery, a lithium-air battery, and the like. In some implementations, such as in V2X applications, the battery 230 may be a typical lead-acid automotive battery.

User interface circuitry 250 includes various input/output (I/O) devices present within, or connected to, the platform 200, and includes one or more user interfaces designed to enable user interaction with the platform 200 and/or peripheral component interfaces designed to enable peripheral component interaction with the platform 200.

Figure 3:
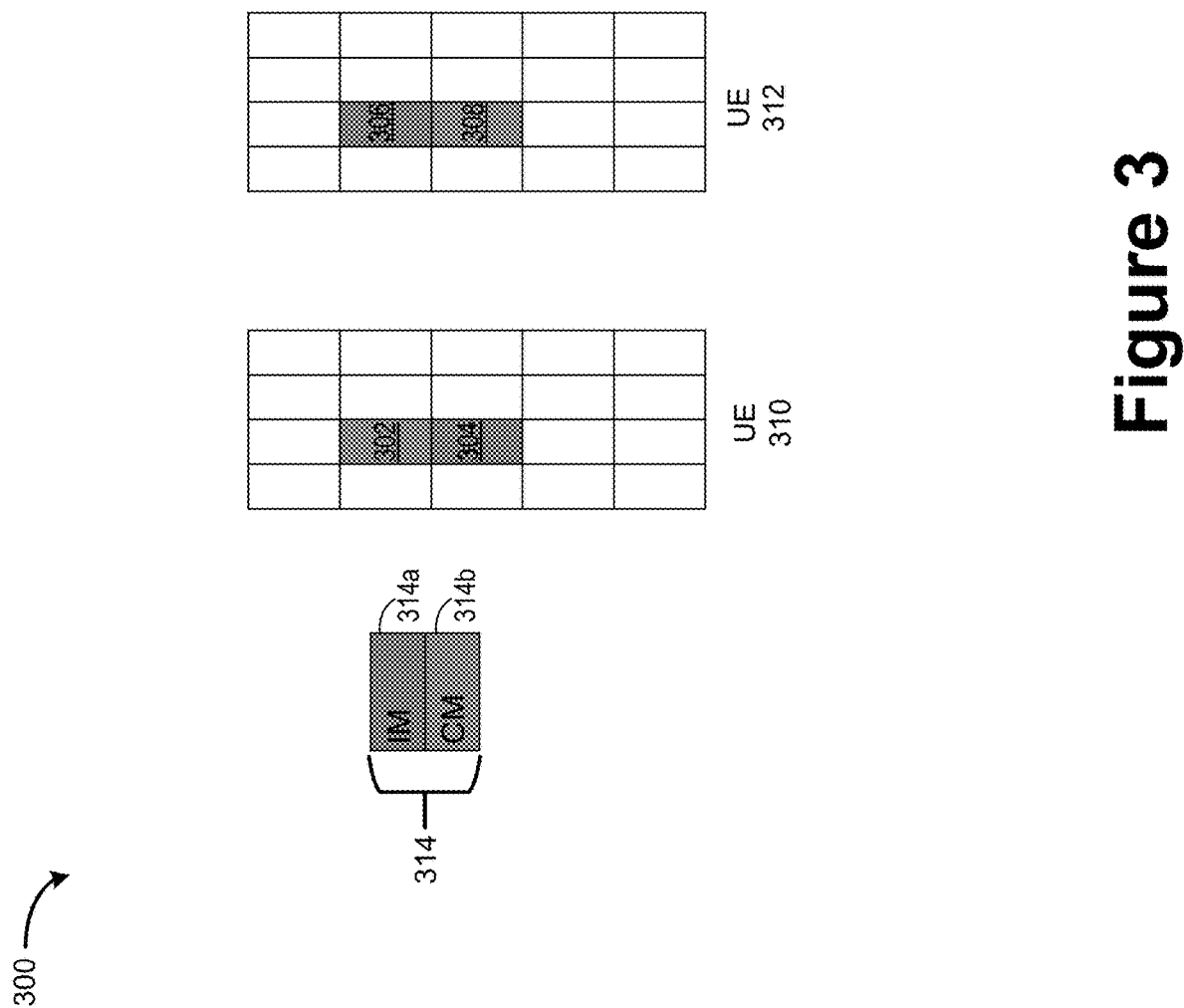
FIG. 3 illustrates examples of CSI reporting by UEs such as the UEs described in relation to FIGS. 1-2.

FIG. 3 shows an example of MU-MIMO communication environment 300 with two UEs 310, 312. UEs 310, 312 can include, for example, UEs 101*a-b* described in relation to FIGS. 1-2. The UEs 310, 312 are configured to communicate with a base station (e.g., one of nodes 111*a-b* described previously in relation to FIGS. 1-2). The UEs 310, 312 are configured for type-II CSI feedback. Type-II CSI feedback enables each of the UEs 310, 312 to send a more accurate channel-state feedback (CSI) 314. The base station uses the CSI feedback 314 to generate a DL precoder for MU-MIMO communication with each of the UEs 310, 312.

The CSI feedback 314 is shown in two parts. A first portion 314*a* includes Non-zero power CSI reference signal (NZP-CSI-RS) for channel measurement (CM). A second portion 314*b* includes NZP-CSI-RS resources for interference measurements (IM). In time-division duplexing (TDD) systems, the UEs 310, 312 use UL sounding reference signals (SRS) to estimate the DL channel, assuming channel reciprocity. The UEs 310, 312 can use the respective channel estimates to generate respective DL precoders, which can each be indicated to the base station using a respective PMI.

The base station is configured to receive the respective channel estimates from each of UEs 310, 312 and determine a super channel DL estimate for MU-MIMO communication. Rather than use the individual precoders of the respective UEs 310, 312, the base station is configured to determine a precoder for each UE that improves overall MU-MIMO performance, as described herein. The super channel estimate represents an estimate of the overall MU-MIMO channel(s) together, accounting for effects of one UE on another UE for any UEs selected for MU-MIMO. The result is that the base station selects precoders for respective UEs 310, 312 that each limit interference among the UEs while also maximizing throughput for each of the UEs.

To determine the super channel DL estimate, the base station receives channel estimate information 314 from each UE, including IM 314*a* and CM 314*b*. The super channel including the set of estimated DL channels between the UEs (K) and the base station is defined as shown in equation (1):

$$H^{(dl)}=[H_1^T, H_2^T, \ldots, H_K^T]^T \in \mathbb{C}^{KN_u \times N_b} \quad (1)$$

where $N_u$ is a number of antennas at a UE (such as UE 310, 312), dl is download, and $N_b$ is a number of antennas at the base station. In this particular example, all UEs have the same number of receive antennas. However, this does not need to be the case. The base station uses the knowledge about $H^{(dl)}$ to design a DL precoder $P^{(dl)}$ for MU-MIMO such that each UE 301, 312 receives a respective data stream with limited interference from the other UE's data stream. While two UEs 310, 312 are shown, the set of UEs can be increased to ten or more. Additionally or alternatively, the base station can schedule a subset of the UEs 310, 312 (e.g., $K_s$ out of K) for MU-MIMO communication. For example, if ten UEs are in the set, UEs 310, 312 can be the selected subset of UEs.

Given the super channel estimate of $H^{(dl)}$ and the determined MU-MIMO precoder $P^{(dl)}$, the UEs 310, 312 can further assist the base station to select a subset of UEs for MU-MIMO. The UEs 310, 312 can also send data to the base station to enable the base station to refine the DL precoder to improve the MU-MIMO operation. Generally, for a given DL MU-MIMO precoder and a set of co-scheduled UEs 310, 312, the base station assesses a quality of the MU-MIMO channels by sending each UE NZP-CSI-RS for channel measurement (CM) 314*a* and NZ-CSI-RS resources for interference measurements (IM) 314*b*. In this example, MU-MIMO is being performed with two UEs 310, 312, but other numbers of UEs can be used. The base station sends one NZP-CSI-RS for CM 314*a* and one NZP-CSI-RS for IM 314*b* for each UE 310, 312. The UE 310 uses block 302 to measure signal power coming from its own NZP-CSI-RS for CM. UE 310 uses block 304 to measure interference coming from the NZP-CSI-RS of UE 312. Additionally, UE 312 uses block 306 to measure interference coming from the NZP-CSI-RS of UE 310. UE 312 uses block 308 to measure signal power coming from its own NZP-CSI-RS for CM.

After each signal is measured, each UE 310, 312 post-process the measurements to compute relevant channel metrics. For example the channel metrics include signal-to-interference-plus-noise ratio (SINR), reference-signal received power (RSRP), or similar channel metrics. The UE sends feedback to the base station, such as a channel-quality-indicator (CQI), ranking indicator (RI), and/or PMI as previously described. The base station derives MU-MIMO quality based on the CSI report from each respective UE 310, 312.

The base station is further configured to overcome several limitation to determining MU-MIMO configurations based on the CSI report from each individual UE 310, 312. For example, CSI-RS resources may not be precoded. If the CSI-RS resources from each UE are precoded, analog beamformers can be used and rather than digital beamformers. If analog beamformers are used, the base station and UEs 310, 312 perform SRS-based channel estimation. Additionally, a particular CSI report at a given UE may not reflect an impact of co-scheduling the other UE. Generally, a single value is used for each reporting quantity (such as CQI). If the base station is co-scheduling multiple UEs, the base station may not be able to pinpoint which UE (or UEs) are adversely impacting MU-MIMO performance, and which UE (or UEs) can be scheduled without adversely impacting MU-MIMO performance (or even improving throughput).

To overcome these potential limitations, the base station is configured as now described. The base station determines a downlink precoder for a given number of UEs (e.g., K UEs). The base station selects a subset of one or more of the given number of the UEs for co-scheduling for MU-MIMO communication. Generally, $H_{RS}^{(k)}$ is the NZP-CSI-RS resource that is allocated to the kth UE for scheduling MU-MIMO communication. The base station allocates a plurality of precoded CSI-RS resources for that particular UE, as shown by equation (2):

$$\overline{H}_{RS,l}^{(k)} = H_{RS}^{(k)} P_l^{(dl)}, l=1,2,\ldots,K \quad (2)$$

wherein $P_l^{(dl)}$ is the precoder for an lth UE of the K UEs. The particular, selected UE (e.g., UE 310 or 312) post-process each CSI-RS measurement to determine the values for metrics used for CQI selection. The selected UE determines the CQI for each CSI-RS resource. The selected UE reports the determine CQI (in this case, K CQIs) to the base station. Ideally, one determined CQI should be large whereas the other CQI values should be small, because these correspond to CSI-RS resources that are precoded within a null space of the UE's channel. Generally, CQI values are from 0 to 15. Low CQI (e.g., 0-3) implies that there is a low signal-to-interference-plus-noise (SINR) region. High CQI (e.g., 10-15), implies a medium-to-high SINR region of operation. For a given UE-k, CSI-RSI resource-k should provide higher CQI than CSI-RS resource-m, where m=1, 2, . . . k−1, k+1, . . . K. Resource-k is precoded with $P_k^{(dl)}$, which is in the direction of UE-k channel, whereas resource-m is precoded with $P_m^{(dl)}$, which is in the direction of UE-m channel orthogonal to UE-k channel (e.g., a null space of UE-k). For this reason, $CQI_k$ is much greater than $CQI_m$ using a correct precoding.

Once the CQI values are determined, the base station determines the set of UEs for MU-MIMO. The base station has $K^2$ CQI values (e.g., K values per UE). The base station uses the CQI values to determine which subset of UEs to select. The base station generates a CQI matrix $Q \in \mathbb{Z}^{K \times K}$, where $[Q]_{i,k} \in \{0,1, \ldots ,15\}$, i,k=1,2, . . . , K. Diagonal elements of the CQI matrix represent CQIs of respective CSI-RS resources that are precoded in a direction of desired channels for each of the UEs (e.g., UEs 310, 312). Off-diagonal elements of the CQI matrix represent CQIs of CSI-RS resources that are precoded in null direction(s) of the channels of the respective UEs 310, 312.

The base station is configured to use a selection process to select the subset of UEs, as subsequently described in further detail. For example, the base station can select a subset of UEs (such as UEs 310, 312) from a set of UEs based on a utility function using a $Q_s$ matrix of the selected UEs. Generally, each UE provides a vector of CQIs (e.g., having a length of K×1). The base station builds the Q matrix (size K×K). Once the base station selects a subset of the UEs, the base station maintains $Q_s$ (a matrix subset of Q) for the selected UEs.

The base station is configured to refine the MU-MIMO precoder(s) for MU-MIMO communication. The base station generates a plurality of precoders for a same UE. For example, the base station is configured to switch between zero force (ZF) and minimized mean square error (MMSE) based precoders. A zero-forcing precoder is designed to completely cancel the multi-user interference, irrespective of noise. An MMSE precoder is designed to minimize the mean-square error (MMSE) between the actual transmitted signal and the processed precoded signal; thus, taking into account interference and noise. The base station generates the precoders by periodically sending precoded CSI-RS resources to the UEs and subsequently updating the Q (or $Q_s$) matrix of the UEs (or the subset of co-scheduled UEs).

To the UEs for MU-MIMO, the base station performs the following actions. The base station executes an optimization process for MU-MIMO UE selection. The objective of the optimization process is to maximize a utility function that depends on the matrix Q for the set of UEs. The base station determines a constraint that a particular number $K_s$ of the UEs are to be selected from the set of K UEs. In some implementations, the subset $K_s$ includes fewer UEs than K. In some implementations, the subset $K_s$ is equal to K.

The optimization process is as follows. Generally, the value of $a \in \mathbb{Z}^{K \times 1}$ is a selection vector. This means that $[a]_k=1$ if the kth UE is selected, and 0 otherwise. Then, $$\sum_{k=1}^{K}[a]_k = K_s.$$

Therefore, equation (3) follows:

$$a^* = \underset{a}{\operatorname{argmax}} f_a(Q), \text{ s.t. } [a]_k \in \{0, 1\}, \sum_{k=1}^{K}[a]_k = K_s \quad (3)$$

Complexity of such formulation depends on the specific utility function used, but the optimization process is generally a combinatorial problem. The utility function can depend on the diagonal elements of the Q matrix to represent the received signal strength at each UE, the off-diagonal elements to represent the received interference strength at each UE, or both diagonal and off-diagonal elements. One example includes defining a reward utility function such as $f_a(Q) = \sum_{k \in \mathcal{K}} [Q]_{k,k} - \sum_{k \in \mathcal{K}} \sum_{j \in \mathcal{K}, j \neq k}[Q]_{k,j}$ (4). The utility value (or reward) is high if diagonal elements of Q are large and off-diagonal elements of Q are small for each selected UE.

In some implementations, the base station performs an iterative process for MU-MIMO UE selection. For example, depending on base station processing power and time constraint, it may limit the maximum number of UEs to select from, K. Thus, the base station performs a dimensionality reduction step. The dimensionality reduction step can be based on, but not limited to, the received signal power strength of each UE, which is quantified by the diagonal elements of the Q matrix (diag(Q)) and then selects the highest $K_s \leq K_0 < K$ values, wherein $K_0$ is a tuning parameter that depends on the base station capability. The base station then stores the corresponding $Q_0 \in \mathbb{C}^{K_0 \times K_0}$ matrix. The base station then selects a subset $K_s$ UEs out of $K_0$, defined by the set $\mathcal{K}_a$, and obtains the corresponding $Q_s$ matrix for each selected UE by optimizing the utility $f_a(Q_0)$ similar to equation (3).

The base station then can repeat the application of selecting a different subsets $K_s$ from K for every possible combination of UEs or for a subset of combinations of the UEs, using either random selection or stopping criteria (e.g., once a suitable combination is found, stop further computation). The base station can then select the subset of UEs corresponding to a highest computed utility value, $f_a$. In some implementations, the base station determines values of $f_a$ for all UE combinations and selects the particular combination of UEs corresponding to the highest value of $f_a$. In some implementations, the base station sets a threshold r and selects a combination of UEs corresponding to a value of $f_a$ that exceeds the threshold r. In this case, the base station can select a subset of UEs without computing a reward value for every possible combination of UEs. The base station can select any combination of UEs corresponding to a reward value that satisfies the threshold reward value r, without necessarily selecting the combination of the UEs corresponding to the highest reward value.

The base station is configured to refine the precoder $P_k^{(dl)}$. In some implementations, the base station refines the precoder $P_k^{(dl)}$ once the set of UEs $K_s$ is determined. The base station, after precoding selection, maintains $Q_s$, and updates $Q_s$ over time. For example, the base station uses periodic CSI-RS resources to periodically monitor diagonal and off-diagonal elements of the CQI matrices for each UE.

To refine the precoder, the base station can perform the following first process. The base station performs CQI-dependent linear precoding. Consider a general precoder $P_k^{(dl)} = W_k^{(inter)} W_k^{(intra)}$, which includes two parts: $W_k^{(inter)}$ is used to cancel inter-UE interference and $W_k^{(intra)}$ is used to cancel the intra-UE interference. The base station is able to change an outer precoder depending on off-diagonal elements of $Q_s$. Additionally, the base station can change an inner precoder depending on diagonal elements of $Q_s$. For example, if $[Q_s]_{k,k}$ is high (e.g., greater than 12), then the base station uses $W_k^{(intra)} = H_k^\dagger$, (e.g., zero-forcing), as zero-forcing is efficient and performs well (e.g., obtains a near-optimal or optimal result) at high SNR. However, if $[Q_s]_{k,k}$ decreases over time, then the base station updates the inner precoder to use the linear MMSE precoder, which is more robust, but more complex (e.g., includes additional computation relative to the ZF approach).

To refine the precoder, the base station can perform the following second process. In this process, the base station uses CQI-dependent triggers for MU-MIMO channel estimation. The base station periodically requests that the UEs send non-precoded SRS transmissions or that the UEs report type-II CSI feedback to estimate the channel. The base station updates the DL precoder using these updated values. Alternatively to periodic requests, which can increase overhead, the base station triggers SRS or type-II CSI feedback requests once elements in $Q_s$ decrease below a tolerable threshold. The base station can be specific about which UEs should transmit SRS or type-II feedback to further reduce bandwidth consumption.

The base station may use a differential CQI matrix to reduce overhead for either the UE selection process, the precoder refinement, or both. Generally, each element in $Q_s$ uses 4 bits because there are 16 CQI indices. To reduce the overhead of signaling, the base station uses differential CQI. The differential CQI uses 4-bits for each of the diagonal elements and only 2-bits for each of the off-diagonal elements. To use the differential CQI, each UE (e.g., UEs 310, 312) determines the CQI of the diagonal elements according to equation (5):

$$[Q]_{k,k} = q(\overline{H}_{RS,k}^{(k)}), \tag{5}$$

where $q(\cdot)$ is the CQI mapping function. The UE then determines the CQI of the off-diagonal elements using equation (6):

$$[Q]_{k,l} = q(\overline{H}_{RS,l}^{(k)}) \tag{6}$$

The UE determines a difference $[Q]_{k,l} = q_d([Q]_{k,k} - [Q]_{k,l})$, where $q_d(\cdot)$ maps the difference into two bits. In this way, during UE selection, the base station uses regular CQI reporting by obtaining Q to determine the subset of $K_s$ UEs to schedule ($Q_s$). The base station then switches to differential CQI mode, where the values of $Q_s$ have diagonal values based on 4-bits of data and off-diagonal values based on 2-bits of data. The differential CQI mode is reported using a new reporting mode such as e.g., reportQuantity=muMimoCqi, where the base station allocates K recoded CSI-RS resources for the UE. The UE then only reports the CQI for each CSI-RS resource. In some implementations, an additional higher-layer parameter is included (e.g., isSpatailCqi) so the UE can determine how to report the CQI (e.g., either using 4-bits or 2-bits).

Generally, each UE measures K (e.g., equal to the number of UEs) number of resources to report back K CQI values. To report back K CQI values and use the proposed MU-MIMO enhancement, the base station requests that each UE reports K number of reports. Each report is linked to a precoded, possibly multi-port, CSI-RS resource. A same group of resources can be shared across UEs.

A process that the network can follow to get these reports is called an eMU-MIMO process. The eMU-MIMO process includes allocating, by the base station, each UE K resource sets of CSI-RS resources. Generally, each resource set includes a single and precoded CSI-RS resource. The kth CSI-RS resource is precoded with the DL precoder of the k-th UE. The precoder is derived from the channel, estimated from uplink SRS. Each resource set is linked to a single report with report quantity criRiCqi. If these criteria are met, the base station is building the CQI matrix (Q). If a memory device is used to store this matrix or a utility function of the Q matrix, and the Q matrix is used in MU-MIMO user scheduling and/or DL MU-MIMO precoding, it is indicative that the base station is configuring MU-MIMO as described herein.

The MU-MIMO scheduling scenario process is performed as now described. In this example, there are two UEs selected from four available UEs. For MU-MIMO operation, each UE generates four reports as requested by the base station, or one report per precoded CSI-RS resource. In this example, a first UE reports a CQI=[H, L, L, L], where H and L refer to high and low values, respectively. This is a vector of four, with the kth element representing the report for the kth precoded CSI-RS resource (e.g., the kth resource is precoded by the DL precoder of the kth UE). The second UE reports CQI=[L, H, L, L]. The third UE and fourth UE each report CQI=[L, L, L, L], or all low CQI values. For these reports from each UE, the base station schedules the first and second UEs because the network is using the CQI matrix in the MU-MIMO scheduling selection.

An example process for MU-MIMO precoder refinement is now described. Once the first and second UEs are scheduled, they are still requested to periodically report the CQIs. The first UE changes CQI(2)=L to CQI(2)=H. In other words, the first UE reports to the base station that that the CQI is high over the 2nd precoded CSI-RS resource, which was supposed to be in the null-space of the first UE's eigenmodes. The UE thus indicates that interference from second UE has increased, and hence the first UE reports increased CQI. The base station then requests that each of the first UE and the second UE send SRS to update their respective precoders, requests the second UE to report CQI more frequently, and/or the first UE experiences that the CQI of the 2nd precoded CSI-RS resources is decreasing. This is because the base station refined the precoder as described herein. The refinement is triggered by the CQI reported by the first UE such that precoder refinement relies on the CQI matrix.

Figure 4:
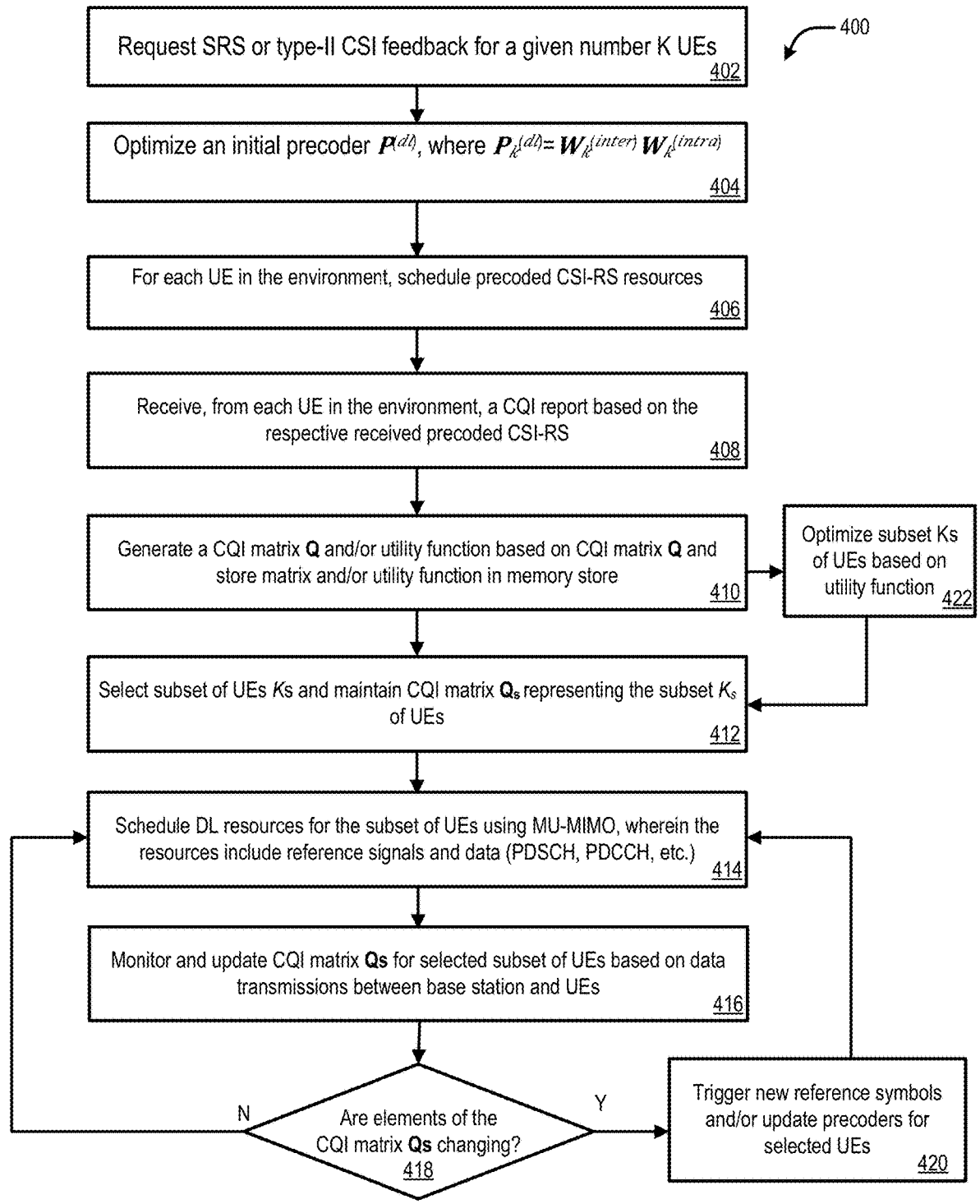
FIG. 4 illustrates an example process for enhancement to MU-MIMO by CSI reporting.

FIG. 4 shows an example process 400 for UE selection and precoder generation by a base station for MU-MIMO operation. In some implementations, the UEs can include the UEs 101a-b of FIGS. 1-3. In some implementations, the base station includes the nodes 111a-b or network 120 as described in relation to FIGS. 1-2.

The process 400 includes requesting (402), by the base station, SRS or type-II CSI feedback for a given number K UEs. In some implementations, the number of UEs includes all the UEs in the environment of the base station. In some implementations, the base station selects a set of the available UEs for determining an optimal subset of UEs for MU-MIMO and/or precoder refinement for MU-MIMO operations for the selected UEs. As described herein, if a number of available UEs is too large, the base station determines a set of candidate UEs, based on CQI reporting, for being the set K of UEs (e.g., by comparing one or more parameters of the reporting to one or more variable thresholds). Generally, this initial selection process is a rough approximation of candidate UEs for MU-MIMO operation. The one or more parameters of the CQI can include NZP-CSI-RS for IM and/or NZP-CSI-RS for CM for a respective UE.

The base station optimizes (404) an initial precoder $P_k^{(dl)}$, where $P_k^{(dl)} = W_k^{(inter)} W_k^{(intra)}$, as previously described. The initial precoder is a DL precoder for the K UEs, and the base station then determines which $K_s$ subset of UEs to co-schedule for MU-MIMO. To obtain the CQI report for each UE, the base station, for each UE in the environment, schedules (406) precoded CSI-RS resources using the initial precoder. The respective UEs post-process each measurement to derive metrics for CQI selection.

The base station receives (408), from each UE in the environment, a respective CQI report based on the respective received precoded CSI-RS sent to the UEs. The base station has $K^2$ CQI values (K for each UE). For each UE, 1 CQI value should be large, whereas the K−1 should be small, because these correspond to CSI-RS resources that are precoded with the null space of the UE's channel.

The base station generates (410) a CQI matrix Q from the CQI values. In some implementations, the base station generates a utility function based on CQI matrix Q as described herein. The base station stores the matrix Q and/or utility function in a memory store. In some implementations, the base station applies the utility function as previously described to optimize selection of subset Ks of UEs. The utility function is described further in relation to FIG. 5. For matrix Q, the diagonal elements represent the CQIs of CSI-RS resources that are precoded in the direction of the UEs' desired channels, whereas the off diagonal elements represent the CQIs of CSI-RS resources precoded in the null direction of the UEs' channels.

The base station is configured to select (412) a subset of UEs Ks and maintain the CQI matrix Qs representing the selected subset Ks of UEs. As described herein, the selection is based on a utility/reward function or by testing each combination of values until a best result is determined.

The base station schedules (414) DL resources for the subset of UEs using MU-MIMO, wherein the resources include reference signals and data (e.g., PDSCH, PDCCH, etc.). The MU-MIMO operation proceeds with the UEs transmitting data to the base station. The base station monitors (416) the transmissions from the UEs and updates CQI matrix Qs for selected subset of UEs based on data trans-missions between base station and UEs. The base station performs this monitoring to determine whether the selected subset of UEs should change or whether the precoder should be reconfigured for the selected subset of UEs. For example, the base station determines (418) if elements of the CQI matrix Qs are changing. If the elements are changing (e.g., the values are change more than 2 CQI indices), the base station is configured to trigger (420) new reference symbols and/or update precoders for the selected UEs. Updating the precoder is described in relation to FIGS. 6A-6B.

Figure 5:
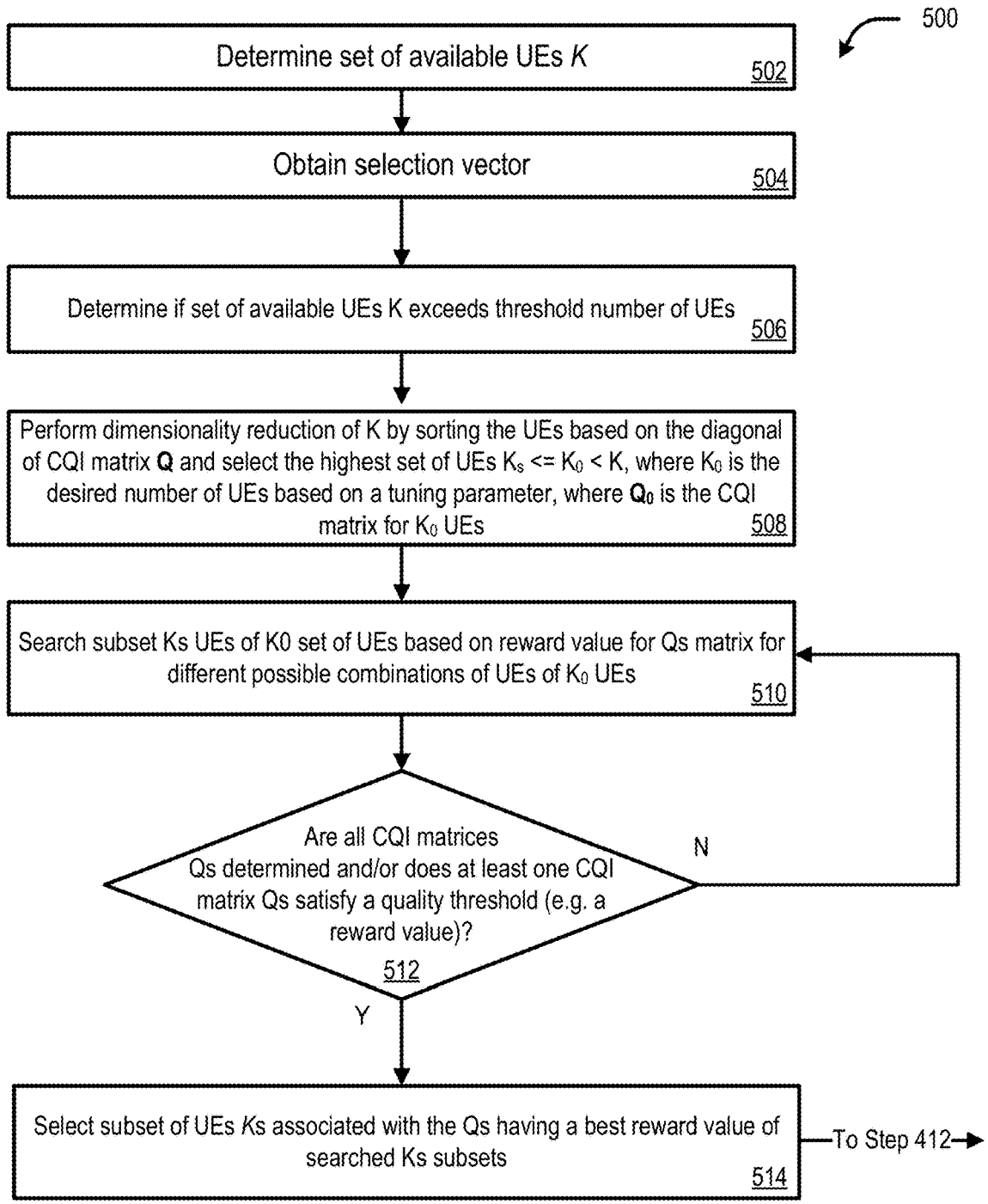
FIG. 5 illustrates an example process of selection of a subset of available UEs for enhancement to MU-MIMO.

FIG. 5 shows an example process 500 for selecting a set of UEs for MU-MIMO. In some implementations, the UEs can include the UEs 101a-b of FIGS. 1-3. In some implementations, the base station includes the nodes 111a-b or network 120 as described in relation to FIGS. 1-4. The selection of UEs by the base station is configured to optimize a utility function or reward function that depends on values of the CQI reports from each UE (e.g., the matrix Q), subject to a constraint that $K_s$ UEs are selected from the set of K UEs.

The base station is configured to determine (502) which UEs are available in an environment. In an example, the set of available UEs can include any UE from which the base station receives a CQI report. The base station obtains (504) a selection vector. The selection vector is $a \in \mathbb{Z}^{K \times 1}$ such that $[a]_k = 1$ if the kth UE is selected, and 0 otherwise. Then, $$a^* = \underset{a}{\mathrm{argmax}}\, f_a(Q),\ \text{s.t.}\ [a]_k \in \{0, 1\},\ \sum_{k=1}^{K} [a]_k = K_s,$$

as previously described.

The number of UEs available is compared (506) to a tuning parameter $K_0$ that depends on base station capabilities or time constraints. If the number of available UEs is too high to apply the utility function, the base station performs (508) a dimensionality reduction of K by sorting the UEs based on the diagonal of CQI matrix Q and selecting the highest set of UEs $K_s <= K_0 < K$, where $K_0$ is the desired number of UEs based on a tuning parameter and where $Q_0$ is the CQI matrix for $K_0$ UEs.

The base station searches (510) a subset Ks UEs of $K_0$ set of UEs based on each reward value for Qs matrix for different possible combinations of UEs of $K_0$ UEs. As described herein, the base station applies the utility function by selecting $K_s$ UEs out of $K_0$ (defined by the set $\mathcal{K}_a$), and obtains the corresponding $Q_s$ matrix. The base station determines a reward $$f_a(Q_0) = \sum_{k \in \mathcal{K}_a} [Q_0]_{kk} - \sum_{k \in \mathcal{K}_a} \sum_{j \in \mathcal{K}_a, j \neq k} [Q_0]_{k,j}$$

for each combination of UEs. The value of the reward is high if diagonal elements of Qs are large and off-diagonal elements are small in relative values.

The base station iterates over combinations of UEs until an acceptable result is obtained. In a first example, the base station exhaustively searches over all available combinations. For example, the base station determines (512) if all CQI matrices Qs are determined and whether at least one CQI matrix Qs satisfies a quality threshold. The quality threshold is satisfied when the reward value of the utility function satisfies a threshold value. In some implementations, the base station stops iterating once the reward threshold is satisfied, even if the selected subset Ks does not have the highest possible utility value. The base station selects (514) the subset of UEs Ks associated with the Qs having a best reward value of searched Ks subsets.

Figure 6A:
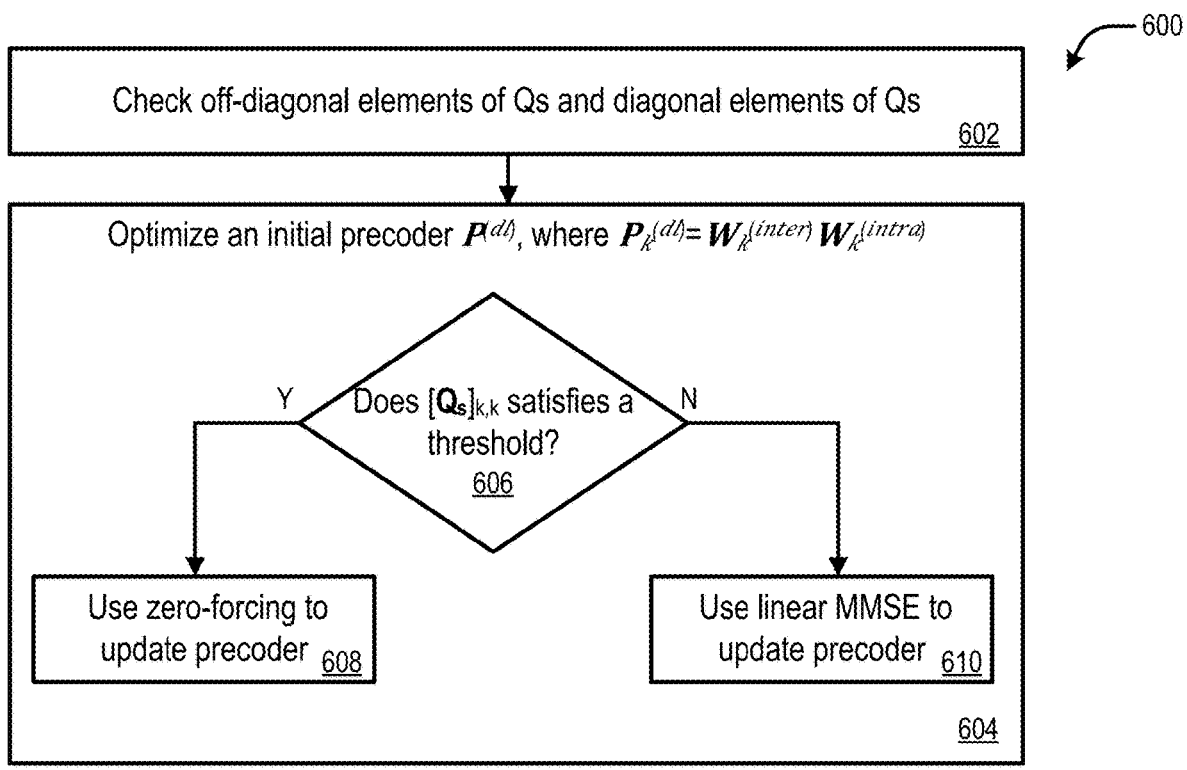
FIG. 6A illustrates an example process for precoder refinement for enhancement to MU-MIMO by CSI reporting.
Figure 6B:
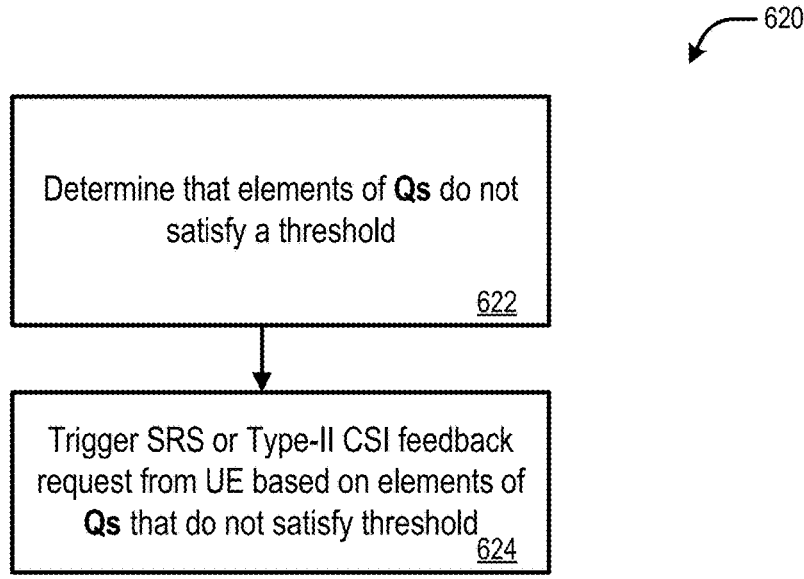
FIG. 6B illustrates an example process for precoder refinement for enhancement to MU-MIMO by CSI reporting.

FIGS. 6A-6B include example processes 600, 620 for precoder refinement for MU-MIMO operation. In some implementations, the UEs can include the UEs 101a-b of FIGS. 1-3. In some implementations, the base station includes the nodes 111a-b or network 120 as described in relation to FIGS. 1-5. To refine the precoder for MU-MIMO operation, the base station maintains $Q_s$, and updates it over time as the UEs transmit data to the base station.

For process 600, the base station uses periodic CSI-RS resources to monitor the diagonal and off-diagonal elements of the CQI matrix Qs for the selected UEs. The base station performs CQI-dependent linear precoding. Because $P_k^{(dl)} = W_k^{(inter)} W_k^{(intra)}$, as previously described, the base station changes the outer precoder depending on the off-diagonal elements of $Q_s$ and can change the inner precoder depending on the diagonal elements of $Q_s$. The base station checks (602) off-diagonal elements of Qs and diagonal elements of Qs. To optimize (604) the precoder, the base station compares the values of the Qs matrix to threshold values. If $[Q_s]_{k,k}$ is high (e.g., satisfies a threshold 606), then the base station uses (608) zero-forcing optimization. If $[Q_s]_{k,k}$ decreases over time (e.g., does not satisfy a threshold 606), then the base station updates (610) the inner precoder using linear MMSE precoder.

For process 620, the base station uses periodic CSI-RS resources to monitor the diagonal and off-diagonal elements of the CQI matrix Qs for the selected UEs. The base station determines (622) that elements of Qs do not satisfy a threshold. Then, the base station triggers (624) SRS or type-II CSI feedback request from UE based on elements of Qs that do not satisfy threshold. This reduces overhead in comparison to periodic requests from the base station for SRS or type-II CSI feedback. In some implementations, the base station can periodically request SRS or type-II CSI feedback to determine whether to update the precoder.

EXAMPLES

In the following sections, further exemplary embodiments are provided.

Example 1 includes a base station for configuring multi-user multiple-input multiple output (MU-MIMO) operation between the base station and a plurality of UEs, the base station comprising: circuitry for sending data to and receiving data from the plurality of UEs; one or more processing devices; and memory storing instructions that, when executed by the one or more processing devices, cause the one or more processing devices to perform operations comprising: requesting sounding reference signals (SRS) or channel state information (CSI) data from each UE of the plurality of UEs; configuring, based on the SRS or CSI data from each UE, a precoder matrix, the precoder matrix allocating a plurality of precoded CSI-reference signal (CSI-RS) resources for each UE; scheduling, for each UE in the plurality, the precoded CSI-RS resources; receiving, from each UE in the plurality, a CQI report that is based on the precoded CSI-RS resources received by that respective UE; generating a CQI matrix from the CQI reports of each UE in the plurality; selecting a subset of UEs from the plurality of UEs based on the CQI matrix; and scheduling DL resources for the subset of UEs, the DL resources including reference signals.

Example 2 includes a base station of example 1 or some other example herein, wherein selecting the subset of UEs from the plurality of UEs comprises: generating, for each of a plurality of potential subsets of the UEs of the plurality of UEs, a subset CQI matrix; applying a reward function to at least one subset CQI matrix; based on applying the reward function, obtaining a reward value for the at least one subset CQI matrix; comparing the reward value to a threshold; and when the reward value satisfies the threshold, selecting the potential subset of UEs, corresponding to the at least one subset CQI matrix, as being the subset of UEs.

Example 3 includes a base station of examples 1-2 or some other example herein, wherein applying the reward function comprises comparing values of diagonal elements of the at least one subset CQI matrix to values of off-diagonal elements of the at least one subset CQI matrix, wherein the reward value is greater when the values of the diagonal elements are relatively larger than the values of the off-diagonal elements.

Example 4 includes a base station of examples 1-3 or some other example herein, wherein selecting the subset of UEs from the plurality of UEs comprises: generating, for each of a plurality of potential subsets of the UEs of the plurality of UEs, a subset CQI matrix; applying a reward function to each subset CQI matrix corresponding to each potential subset of UEs; obtaining respective reward values for each subset CQI matrix; ranking, based on the respective reward values, each subset CQI matrix; and selecting, based on the ranking, as being the subset of UEs, the potential subset of UEs corresponding to a subset CQI matrix having a higher reward value than one or more other subset CQI matrices.

Example 5 includes a base station of examples 1-4 or some other example herein, the operations further comprising: receiving, from at least one UE of the plurality, an additional CQI report based on the scheduled DL resources for that UE; updating the CQI matrix based on the additional CQI report; and updating, for one or more UEs of the plurality of the UEs, the precoder matrix, wherein the one or more UEs include the at least one UE.

Example 6 includes a base station of examples 1-5 or some other example herein, the operations further comprising: receiving, from at least one UE of the plurality, an additional CQI report based on the scheduled DL resources for that UE; updating the CQI matrix based on the additional CQI report; and updating, for one or more UEs of the plurality of the UEs, at least one reference symbol of the CSI-RS.

Example 7 includes a station of examples 1-6 or some other example herein, the operations further comprising: generating a second CQI matrix for the subset of UEs, wherein the DL resources are scheduled based on one or more values of the second CQI matrix.

Example 8 includes a base station of examples 1-7 or some other example herein, wherein the one or more values of the second CQI matrix comprise a diagonal of the CQI matrix.

Example 9 includes a base station of examples 1-8 or some other example herein, the operations further comprising: generating a differential CQI matrix that uses four bits for each diagonal element of the differential CQI matrix and two bits for each off-diagonal element of the differential CQI matrix, the differential CQI matrix comprising a difference between a first CQI of the diagonal elements of the CQI matrix and second CQI of the off-diagonal elements of the CQI matrix; and scheduling the DL resources, selecting the subset of UEs, or updating the precoder matrix is based on the differential CQI matrix.

Example 10 includes a base station of examples 1-9 or some other example herein, wherein the CQI report comprises a number of CQI values corresponding to a number of UEs in the plurality of UEs.

Example 11 includes a base station of examples 1-10 or some other example herein, wherein the precoded CSI-RS resources for each UE comprise a CSI-RS resource for time frequency resource allocated for MU-MIMO operation for the plurality of UEs.

Example 12 includes a base station of examples 1-11 or some other example herein, the operations further comprising updating the precoder matrix by performing operations comprising: monitoring, based on periodic CSI-RS resources sent to the subset of UEs, diagonal elements and off-diagonal elements of the CQI matrix; when a difference between the diagonal elements and the off-diagonal elements of the CQI matrix exceeds a threshold, updating the precoder matrix using zero-forcing optimization; and when the difference between the diagonal elements and the off-diagonal elements of the CQI matrix does not exceed the threshold, updating the precoder matrix using linear minimized mean-squared error (MMSE) optimization.

Example 13 includes a base station of examples 1-12 or some other example herein, the operations further comprising updating the precoder matrix by performing operations comprising: monitoring, based on periodic CSI-RS resources sent to the subset of UEs, diagonal elements of the CQI matrix; when values of the diagonal elements fail to satisfy a threshold value, triggering a SRS or a type-II CSI feedback request from the subset of UEs; and updating the precoder matrix based on a response from each of the UEs to the SRS or the type-II CSI feedback request.

Example 14 includes a baseband processor for configuring multi-user multiple-input multiple output (MU-MIMO) operation between a base station and a plurality of UEs, the baseband processor comprising: circuitry for sending data to and receiving data from the plurality of UEs; a processing devices; and memory storing instructions that, when executed by the processing device, cause the processing device to perform operations comprising: requesting sounding reference signals (SRS) or channel state information (CSI) data from each UE of the plurality of UEs; configuring, based on the SRS or CSI data from each UE, a precoder matrix, the precoder matrix allocating a plurality of precoded CSI-reference signal (CSI-RS) resources for each UE; scheduling, for each UE in the plurality, the precoded CSI-RS resources; receiving, from each UE in the plurality, a CQI report that is based on the precoded CSI-RS resources received by that respective UE; generating a CQI matrix from the CQI reports of each UE in the plurality; selecting a subset of UEs from the plurality of UEs based on the CQI matrix; and scheduling DL resources for the subset of UEs, the DL resources including reference signals.

Example 15 includes a baseband processor of example 14 or some other example herein, wherein selecting the subset of UEs from the plurality of UEs comprises: generating, for each of a plurality of potential subsets of the UEs of the plurality of UEs, a subset CQI matrix; applying a reward function to at least one subset CQI matrix; based on applying the reward function, obtaining a reward value for the at least one subset CQI matrix; comparing the reward value to a threshold; and when the reward value satisfies the threshold, selecting the potential subset of UEs, corresponding to the at least one subset CQI matrix, as being the subset of UEs.

Example 16 includes a baseband processor of examples 14-15 or some other example herein, wherein applying the reward function comprises comparing values of diagonal elements of the at least one subset CQI matrix to values of off-diagonal elements of the at least one subset CQI matrix, wherein the reward value is greater when the values of the diagonal elements are relatively larger than the values of the off-diagonal elements.

Example 17 includes a baseband processor of examples 14-16 or some other example herein, wherein selecting the subset of UEs from the plurality of UEs comprises: generating, for each of a plurality of potential subsets of the UEs of the plurality of UEs, a subset CQI matrix; applying a reward function to each subset CQI matrix corresponding to each potential subset of UEs; obtaining respective reward values for each subset CQI matrix; ranking, based on the respective reward values, each subset CQI matrix; and selecting, based on the ranking, as being the subset of UEs, the potential subset of UEs corresponding to a subset CQI matrix having a higher reward value than one or more other subset CQI matrices.

Example 18 includes a baseband processor of examples 14-17, the operations further comprising: receiving, from at least one UE of the plurality, an additional CQI report based on the scheduled DL resources for that UE; updating the CQI matrix based on the additional CQI report; and updating, for one or more UEs of the plurality of the UEs, the precoder matrix, wherein the one or more UEs include the at least one UE.

Example 19 includes a baseband processor of examples 14-18, the operations further comprising: receiving, from at least one UE of the plurality, an additional CQI report based on the scheduled DL resources for that UE; updating the CQI matrix based on the additional CQI report; and updating, for one or more UEs of the plurality of the UEs, at least one reference symbol of the CSI-RS.

Example 20 includes a baseband processor of examples 14-19, the operations further comprising: generating a second CQI matrix for the subset of UEs, wherein the DL resources are scheduled based on one or more values of the second CQI matrix.

Example 21 may include a signal as described in or related to any of examples 1-52, or portions or parts thereof.

Example 22 may include a datagram, information element, packet, frame, segment, PDU, or message as described in or related to any of examples 1-20, or portions or parts thereof, or otherwise described in the present disclosure.

Example 23 may include a signal encoded with data as described in or related to any of examples 1-20, or portions or parts thereof, or otherwise described in the present disclosure.

Example 24 may include a signal encoded with a datagram, IE, packet, frame, segment, PDU, or message as described in or related to any of examples 1-20, or portions or parts thereof, or otherwise described in the present disclosure.

Example 25 may include an electromagnetic signal carrying computer-readable instructions, wherein execution of the computer-readable instructions by one or more processors is to cause the one or more processors to perform the method, techniques, or process as described in or related to any of examples 1-24, or portions thereof.

Example 26 may include a computer program comprising instructions, wherein execution of the program by a processing element is to cause the processing element to carry out the method, techniques, or process as described in or related to any of examples 1-52, or portions thereof.

Example 27 may include a signal in a wireless network as shown and described herein.

Example 28 may include a method of communicating in a wireless network as shown and described herein.

Example 29 may include a system for providing wireless communication as shown and described herein.

Example 30 may include a device for providing wireless communication as shown and described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

What is claimed is:

1. A base station for configuring multi-user multiple-input multiple output (MU-MIMO) operation between the base station and a plurality of UEs, the base station comprising:
   circuitry for sending data to and receiving data from the plurality of UEs;
   one or more processing devices; and
   memory storing instructions that, when executed by the one or more processing devices, cause the one or more processing devices to perform operations comprising:
      requesting sounding reference signals (SRS) or channel state information (CSI) data from each UE of the plurality of UEs;
      configuring, based on the SRS or CSI data from each UE, a precoder matrix, the precoder matrix allocating a plurality of precoded CSI-reference signal (CSI-RS) resources for each UE;
      scheduling, for each UE in the plurality, the precoded CSI-RS resources;
      receiving, from each UE in the plurality, a CQI report that is based on the precoded CSI-RS resources received by that respective UE;
      generating a CQI matrix from the CQI reports of each UE in the plurality;
      selecting a subset of UEs from the plurality of UEs based on the CQI matrix; and
      scheduling DL resources for the subset of UEs, the DL resources including reference signals.

2. The base station of claim 1, wherein selecting the subset of UEs from the plurality of UEs comprises:
   generating, for each of a plurality of potential subsets of the UEs of the plurality of UEs, a subset CQI matrix;
   applying a reward function to at least one subset CQI matrix;
   based on applying the reward function, obtaining a reward value for the at least one subset CQI matrix;
   comparing the reward value to a threshold; and
   when the reward value satisfies the threshold, selecting the potential subset of UEs, corresponding to the at least one subset CQI matrix, as being the subset of UEs.

3. The base station of claim 2, wherein applying the reward function comprises comparing values of diagonal elements of the at least one subset CQI matrix to values of off-diagonal elements of the at least one subset CQI matrix, wherein the reward value is greater when the values of the diagonal elements are relatively larger than the values of the off-diagonal elements.

4. The base station of claim 1, wherein selecting the subset of UEs from the plurality of UEs comprises:
   generating, for each of a plurality of potential subsets of the UEs of the plurality of UEs, a subset CQI matrix;
   applying a reward function to each subset CQI matrix corresponding to each potential subset of UEs;
   obtaining respective reward values for each subset CQI matrix;
   ranking, based on the respective reward values, each subset CQI matrix; and
   selecting, based on the ranking, as being the subset of UEs, the potential subset of UEs corresponding to a subset CQI matrix having a higher reward value than one or more other subset CQI matrices.

5. The base station of claim 1, the operations further comprising:
   receiving, from at least one UE of the plurality, an additional CQI report based on the scheduled DL resources for that UE;
   updating the CQI matrix based on the additional CQI report; and
   updating, for one or more UEs of the plurality of the UEs, the precoder matrix, wherein the one or more UEs include the at least one UE.

6. The base station of claim 1, the operations further comprising:
   receiving, from at least one UE of the plurality, an additional CQI report based on the scheduled DL resources for that UE;
   updating the CQI matrix based on the additional CQI report; and
   updating, for one or more UEs of the plurality of the UEs, at least one reference symbol of the CSI-RS.

7. The base station of claim 1, the operations further comprising:
   generating a second CQI matrix for the subset of UEs, wherein the DL resources are scheduled based on one or more values of the second CQI matrix.

8. The base station of claim 7, wherein the one or more values of the second CQI matrix comprise a diagonal of the CQI matrix.

9. The base station of claim 1, the operations further comprising:
   generating a differential CQI matrix that uses four bits for each diagonal element of the differential CQI matrix and two bits for each off-diagonal element of the differential CQI matrix, the differential CQI matrix comprising a difference between a first CQI of the diagonal elements of the CQI matrix and second CQI of the off-diagonal elements of the CQI matrix; and
   scheduling the DL resources, selecting the subset of UEs, or updating the precoder matrix is based on the differential CQI matrix.

10. The base station of claim 1, wherein the CQI report comprises a number of CQI values corresponding to a number of UEs in the plurality of UEs.

11. The base station of claim 1, wherein the precoded CSI-RS resources for each UE comprise a CSI-RS resource for time frequency resource allocated for MU-MIMO operation for the plurality of UEs.

12. The base station of claim 1, the operations further comprising updating the precoder matrix by performing operations comprising:
    monitoring, based on periodic CSI-RS resources sent to the subset of UEs, diagonal elements and off-diagonal elements of the CQI matrix;
    when a difference between the diagonal elements and the off-diagonal elements of the CQI matrix exceeds a threshold,
       updating the precoder matrix using zero-forcing optimization; and
    when the difference between the diagonal elements and the off-diagonal elements of the CQI matrix does not exceed the threshold,
       updating the precoder matrix using linear minimized mean-squared error (MMSE) optimization.

13. The base station of claim 1, the operations further comprising updating the precoder matrix by performing operations comprising:
    monitoring, based on periodic CSI-RS resources sent to the subset of UEs, diagonal elements of the CQI matrix;

when values of the diagonal elements fail to satisfy a threshold value, triggering a SRS or a type-II CSI feedback request from the subset of UEs; and updating the precoder matrix based on a response from each of the UEs to the SRS or the type-II CSI feedback request.

14. A baseband processor for configuring multi-user multiple-input multiple output (MU-MIMO) operation between a base station and a plurality of UEs, the baseband processor comprising:

circuitry for sending data to and receiving data from the plurality of UEs;

a processing devices; and memory storing instructions that, when executed by the processing device, cause the processing device to perform operations comprising:

requesting sounding reference signals (SRS) or channel state information (CSI) data from each UE of the plurality of UEs;

configuring, based on the SRS or CSI data from each UE, a precoder matrix, the precoder matrix allocating a plurality of precoded CSI-reference signal (CSI-RS) resources for each UE;

scheduling, for each UE in the plurality, the precoded CSI-RS resources;

receiving, from each UE in the plurality, a CQI report that is based on the precoded CSI-RS resources received by that respective UE;

generating a CQI matrix from the CQI reports of each UE in the plurality;

selecting a subset of UEs from the plurality of UEs based on the CQI matrix; and scheduling DL resources for the subset of UEs, the DL resources including reference signals.

15. The baseband processor of claim 14, wherein selecting the subset of UEs from the plurality of UEs comprises:

generating, for each of a plurality of potential subsets of the UEs of the plurality of UEs, a subset CQI matrix;

applying a reward function to at least one subset CQI matrix;

based on applying the reward function, obtaining a reward value for the at least one subset CQI matrix;

comparing the reward value to a threshold; and when the reward value satisfies the threshold, selecting the potential subset of UEs, corresponding to the at least one subset CQI matrix, as being the subset of UEs.

16. The baseband processor of claim 15, wherein applying the reward function comprises comparing values of diagonal elements of the at least one subset CQI matrix to values of off-diagonal elements of the at least one subset CQI matrix, wherein the reward value is greater when the values of the diagonal elements are relatively larger than the values of the off-diagonal elements.

17. The baseband processor of claim 14, wherein selecting the subset of UEs from the plurality of UEs comprises:

generating, for each of a plurality of potential subsets of the UEs of the plurality of UEs, a subset CQI matrix;

applying a reward function to each subset CQI matrix corresponding to each potential subset of UEs;

obtaining respective reward values for each subset CQI matrix;

ranking, based on the respective reward values, each subset CQI matrix; and selecting, based on the ranking, as being the subset of UEs, the potential subset of UEs corresponding to a subset CQI matrix having a higher reward value than one or more other subset CQI matrices.

18. The baseband processor of claim 14, the operations further comprising:

receiving, from at least one UE of the plurality, an additional CQI report based on the scheduled DL resources for that UE;

updating the CQI matrix based on the additional CQI report; and updating, for one or more UEs of the plurality of the UEs, the precoder matrix, wherein the one or more UEs include the at least one UE.

19. The baseband processor of claim 14, the operations further comprising:

receiving, from at least one UE of the plurality, an additional CQI report based on the scheduled DL resources for that UE;

updating the CQI matrix based on the additional CQI report; and updating, for one or more UEs of the plurality of the UEs, at least one reference symbol of the CSI-RS.

20. The baseband processor of claim 14, the operations further comprising:

generating a second CQI matrix for the subset of UEs, wherein the DL resources are scheduled based on one or more values of the second CQI matrix.

* * * * *